United States Patent
Peabody

(10) Patent No.: US 7,504,177 B2
(45) Date of Patent: Mar. 17, 2009

(54) RESERVE BATTERY WITH SET BACK MECHANISM FOR DELAYED BATTERY ACTIVATION

(75) Inventor: Mark John Peabody, Carl Junction, MO (US)

(73) Assignee: Eaglepicher Technologies, LLC, Joplin, MO (US)

(*) Notice: Subject to any disclaimer, the term of this patent is extended or adjusted under 35 U.S.C. 154(b) by 652 days.

(21) Appl. No.: 10/924,000

(22) Filed: Aug. 23, 2004

(65) Prior Publication Data

US 2006/0040174 A1 Feb. 23, 2006

(51) Int. Cl.
*H01M 6/38* (2006.01)
(52) U.S. Cl. .......................... 429/113; 429/116; 429/114
(58) Field of Classification Search ................ 429/116, 429/110, 113, 114, 52, 50, 179, 180
See application file for complete search history.

(56) References Cited

U.S. PATENT DOCUMENTS

| | | | |
|---|---|---|---|
| 2,403,567 A | 7/1946 | Wales, Jr. | 136/90 |
| 2,656,401 A | 10/1953 | Everett | 136/90 |
| 2,682,567 A | 6/1954 | Porter | 136/90 |
| 2,852,592 A | 9/1958 | Salauze | 136/90 |
| 2,931,848 A | 4/1960 | Burrell | 136/90 |
| 2,989,576 A | 6/1961 | Jacobs | 136/90 |
| 3,445,295 A | 5/1969 | Smith et al. | 136/90 |
| 3,464,863 A | 9/1969 | Barron | 136/114 |
| 3,484,297 A | 12/1969 | Zaleski | 136/114 |
| 3,619,298 A | 11/1971 | Jammet et al. | 136/114 |
| 3,653,972 A | 4/1972 | Bolles | 136/90 |
| 3,653,973 A | 4/1972 | Broglid | 136/114 |
| 3,665,178 A | 5/1972 | Sussingham et al. | 240/10.6 |
| 3,674,566 A | 7/1972 | Powers | 136/114 |
| 3,718,508 A | 2/1973 | Levine | 136/90 |
| 3,750,584 A | 8/1973 | Voyentzle et al. | 102/70.2 R |
| 3,754,996 A | 8/1973 | Snyder | 136/90 |
| 3,894,888 A | 7/1975 | Gold | 136/114 |
| 3,929,507 A | 12/1975 | Bro et al. | 136/114 |
| 3,930,885 A | 1/1976 | Dey | 136/114 |
| 3,945,845 A | 3/1976 | Morganstein | 136/90 |
| 4,031,296 A | 6/1977 | Sarbacher et al. | 429/116 |

(Continued)

FOREIGN PATENT DOCUMENTS

GB 2059672 A 4/1981

(Continued)

*Primary Examiner*—Raymond Alejandro
(74) *Attorney, Agent, or Firm*—Wood, Herron & Evans LLP

(57) ABSTRACT

A reserve battery including a dual-purpose fill port member that also operates as a battery activation mechanism. The reserve battery includes a frangible barrier positioned inside a case. The frangible barrier divides the case into a first compartment holding cell electrodes and a second compartment capable of holding an electrolyte in isolation from the first compartment. Positioned in the second compartment proximate to the frangible barrier is a fill port member that is movable in response to an applied force for rupturing the frangible barrier. The fill port member also has a fluid passageway for use in transferring an amount of the electrolyte to the second compartment. The dual purpose of the fill port member is that it efficiently uses the available space and permits the design and production of a more compact reserve battery for use in space-limited applications, such as artillery shells.

9 Claims, 2 Drawing Sheets

U.S. PATENT DOCUMENTS

| | | | |
|---|---|---|---|
| 4,048,396 A | 9/1977 | Hollander, Jr. | 429/116 |
| 4,049,888 A | 9/1977 | Flender | 429/115 |
| 4,061,842 A | 12/1977 | Evans | 429/116 |
| 4,087,594 A | 5/1978 | Marincic et al. | 429/90 |
| 4,119,038 A | 10/1978 | Allen et al. | 102/207 |
| 4,148,974 A | 4/1979 | Eppley | 429/101 |
| 4,196,264 A | 4/1980 | Troedsson et al. | 429/114 |
| 4,218,525 A | 8/1980 | Selgin | 429/114 |
| 4,375,504 A | 3/1983 | Jensen et al. | 429/115 |
| 4,433,036 A | 2/1984 | Horning et al. | 429/114 |
| 4,446,211 A | 5/1984 | Goebel et al. | 429/101 |
| 4,477,543 A | 10/1984 | Bjorklund | 429/115 |
| 4,517,736 A | 5/1985 | Goebel | 29/623.2 |
| 4,588,662 A | 5/1986 | McManis, III et al. | 429/52 |
| 4,596,753 A | 6/1986 | Boyle et al. | 429/114 |
| 4,612,264 A | 9/1986 | Fairwood et al. | 429/114 |
| H178 H | 12/1986 | Biggar | 429/114 |
| 4,642,275 A | 2/1987 | Smith et al. | 429/52 |
| 4,684,586 A | 8/1987 | Haskins et al. | 429/115 |
| 4,684,587 A | 8/1987 | Batson et al. | 429/115 |
| 4,695,520 A | 9/1987 | Koper et al. | 429/116 |
| 4,699,854 A | 10/1987 | Snyder | 429/114 |
| 4,762,757 A | 8/1988 | Eppley et al. | 429/114 |
| 4,800,141 A | 1/1989 | Eppley et al. | 429/116 |
| 4,803,135 A | 2/1989 | Garoutte | 429/116 |
| 4,831,932 A | 5/1989 | Bayerkohler et al. | 102/202.5 |
| 4,861,686 A | 8/1989 | Snyder | 429/90 |
| 4,948,683 A | 8/1990 | Picozzi et al. | 429/90 |
| 4,950,565 A | 8/1990 | Schisselbauer et al. | 429/116 |
| 4,968,567 A * | 11/1990 | Schisselbauer | 429/90 |
| 5,068,162 A | 11/1991 | Kulkarni | 429/116 |
| 5,175,065 A | 12/1992 | Lammers et al. | 427/114 |
| 5,271,327 A | 12/1993 | Filo et al. | 102/207 |
| 5,356,098 A | 10/1994 | Post | 246/169 A |
| 5,679,478 A | 10/1997 | Hancock et al. | 429/63 |
| 5,985,481 A | 11/1999 | Champagne et al. | 429/90 |
| 6,673,486 B2 * | 1/2004 | Rudenauer et al. | 429/114 |
| 6,844,108 B1 * | 1/2005 | Lee et al. | 429/116 |

FOREIGN PATENT DOCUMENTS

| | | | |
|---|---|---|---|
| GB | 2063551 A | | 6/1981 |
| WO | WO 00/08699 | * | 2/2000 |

* cited by examiner

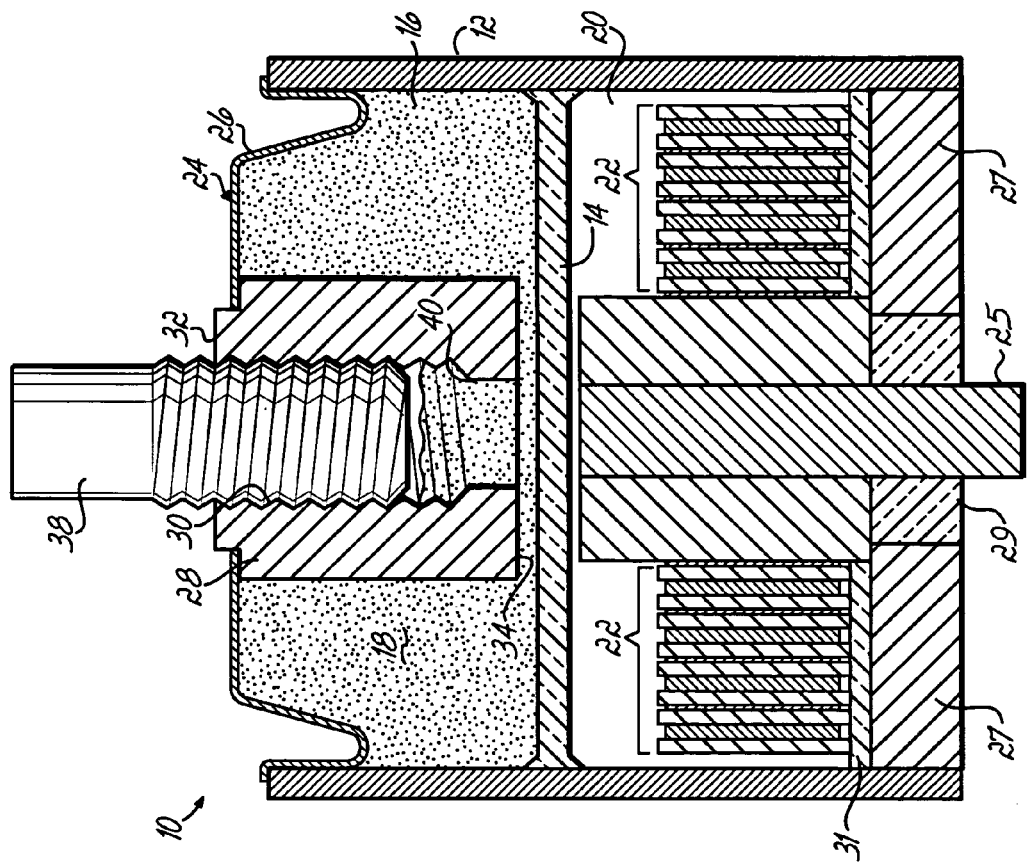
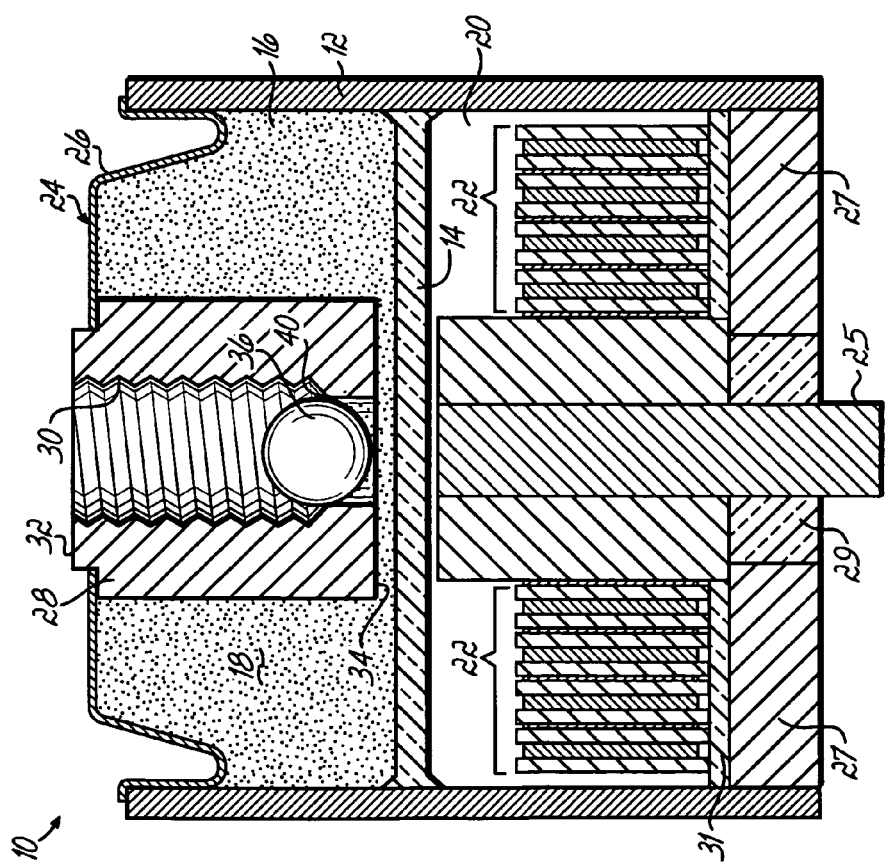

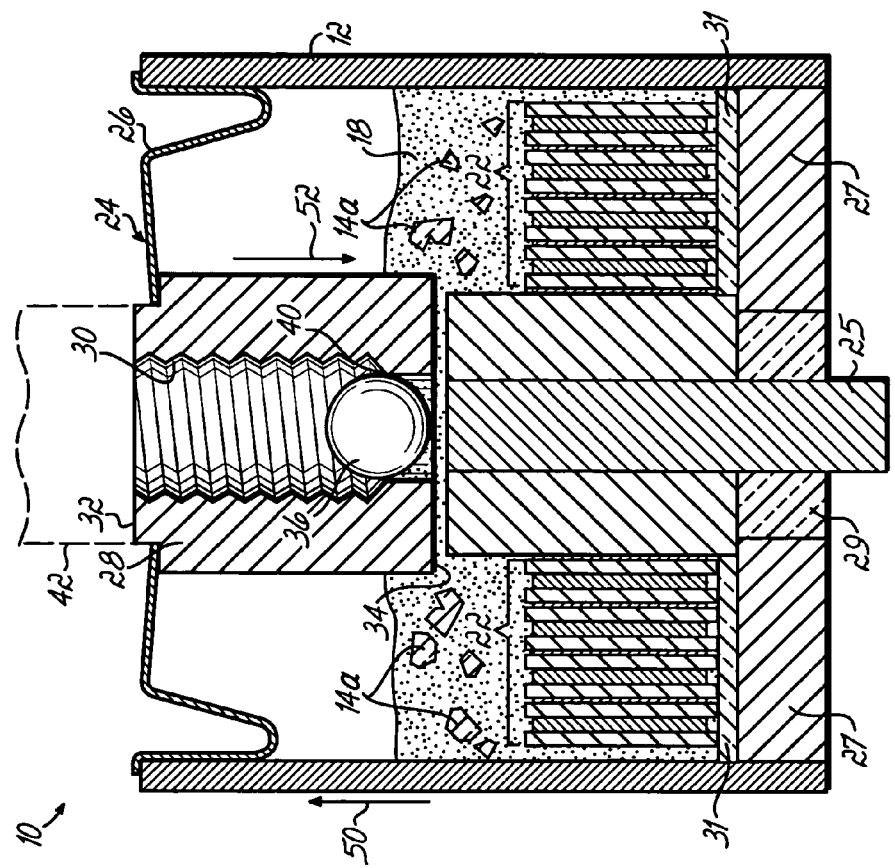
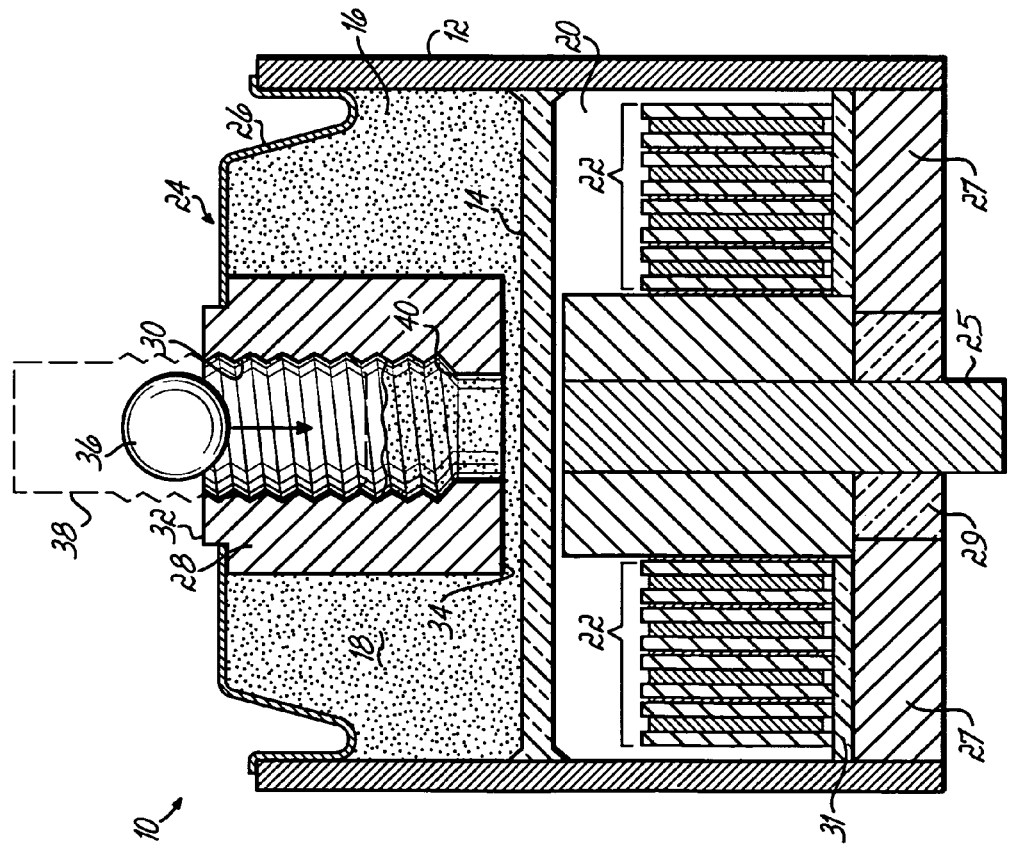

RESERVE BATTERY WITH SET BACK MECHANISM FOR DELAYED BATTERY ACTIVATION

FIELD OF THE INVENTION

The invention relates generally to reserve batteries, and more particularly, to reserve batteries with set back activation mechanisms.

BACKGROUND OF THE INVENTION

Reserve batteries represent reliable sources of portable electrical power following long periods of storage and are designed to be activated very quickly with little degradation in performance over time. In some applications, the reserve battery must have a prolonged shelf life even at extreme temperatures. Once activated, the reserve battery electrically powers a circuit for a few seconds to a few minutes. No maintenance is required for the reserve battery during storage prior to use, permitting it to be permanently installed in equipment.

One reserve battery construction, widely used as a source of in-flight electrical power for components of artillery projectiles, physically separates a reservoir filled with electrolyte and cell electrodes with a frangible barrier. The battery cells are stored in a dry condition and are wetted during flight of the projectile with electrolyte. In artillery projectiles, the reserve battery should have a shelf life exceeding twenty years while stored at temperatures ranging from −40° F. to +145° F. When the artillery shell is loaded into a weapon and the weapon is fired, the set back force applied by the artillery projectile to the reserve battery precipitates rupture of the frangible barrier.

Electrolyte flows from the reservoir through the breach in the frangible barrier and wets the cell electrodes, which activates the reserve battery for powering a circuit in the artillery projectile such as electronics of a proximity fuse or electronics of a self-destruct mechanism.

Conventional reserve batteries include, as distinct components, a fill port and a breaking device. The fill port is used to introduce electrolyte into the reservoir inside the reserve battery and may be sealed using a ball seal with an interference fit.

The breaking device operates to rupture the frangible barrier when the weapon is fired, so that the electrolyte can wet the cell electrodes. In small conventional reserve batteries, the fill port and the breaking device collectively occupy a significant volume of the reservoir that could otherwise be used to store electrolyte, which represents a significant disadvantage.

It would be desirable, therefore, to provide a compact reserve battery with improved space utilization.

SUMMARY

In one embodiment of the invention, a reserve battery includes a case and a frangible barrier positioned inside the case. The frangible barrier divides the case into a first compartment and a second compartment capable of holding an electrolyte in isolation from the first compartment. The reserve battery further includes a plurality of cell electrodes positioned in the first compartment and a fill port member positioned in the second compartment proximate to the frangible barrier. The fill port member is movable in response to an applied force for rupturing the frangible barrier. The fill port member also has a fluid passageway for transferring an amount of the electrolyte to the second compartment.

The reserve battery of the invention improves upon conventional reserve batteries. More specifically, the reserve battery of the invention has a fill port member that operates as a filling port for introducing electrolyte and that also operates as an activation mechanism or ram capable of rupturing the frangible barrier separating the electrolyte from the battery cells. The dual purpose of the fill port member is that it efficiently uses the available space and permits the design and production of a more compact reserve battery for use in space-limited applications, such as artillery shells.

These and other objects and advantages of the present invention shall become more apparent from the accompanying drawings and description thereof.

BRIEF DESCRIPTION OF THE FIGURES

The accompanying drawings, which are incorporated in and constitute a part of this specification, illustrate embodiments of the invention and, together with a general description of the invention given above, and the detailed description given below, serve to explain the principles of the invention.

FIG. 1 is a partial cross-sectional view of a reserve battery in accordance with the invention;

FIG. 2 is a view of the reserve battery of FIG. 1 coupled with a nozzle that fills the reserve battery with electrolyte;

FIG. 3 is a view of the reserve battery of FIG. 2 after filled with electrolyte and before the fill port is plugged with the sealing member; and FIG. 4 is a view of the reserve battery of FIG. 1 during activation.

DETAILED DESCRIPTION OF THE PREFERRED EMBODIMENTS

With reference to FIG. 1, a reserve battery 10 includes a sealed battery case 12 having an interior that is partitioned by a breakable or frangible barrier 14 into one sealed cavity or compartment 16 defining a reservoir filled with an electrolyte 18 and another sealed cavity or compartment 20 enclosing a plurality of cell electrodes 22. The battery case 12 may be formed in a variety of shapes, but typically is cylindrical. The frangible barrier 14 provides a fluid-tight hermetic seal that isolates and physically separates the electrolyte 18 from the cell electrodes 22. The cell electrodes 22, which are maintained in a dry and inactive state, are activated to generate power only when exposed to electrolyte 18.

An annular cell cover 27 is joined about its outer periphery with the battery case 12 for sealing compartment 20. A terminal pin 25 is positioned inside the inner bore of annular cell cover 27 and is electrically insulated from the cell cover 27 by an intervening ring 29 of insulating material. Terminal pin 25 electrically couples the cell electrodes 22 with a circuit (not shown) external to the battery case 12. An exposed portion of the terminal pin 25 outside of the sealed battery case 12 is available for establishing an electrical connection with the cell electrodes 22. An annular disk 31 of insulating material, which has a central bore receiving a portion of the terminal pin 25, electrically insolates the cell cover 27 from the cell electrodes 22 and is coaxial with the cell cover 27.

The battery case 12 may be formed from any suitable material resistant to any corrosive effects of a typical electrolyte 18, including but not limited to KOVAR (i.e., ASTM F15 Ni/Fe/Co alloy) and stainless steels. In one embodiment of the invention, the case 12 is cylindrical with a diameter of about 0.25" and a height of about 0.3". The frangible barrier 14 may be formed from a continuous, solid disk of any suitable material, such as a brittle glass, and thickness that is stable for extended periods of time when exposed to the electrolyte 18, that is susceptible to fracture or rupture when exposed to an applied force of a magnitude determined by the specific application for reserve battery 10, and that is sturdy enough to resist premature rupture or fracture due to, for example, handling of the device in which the reserve battery 10 is installed. If the device is an artillery shell, for example, the frangible barrier 14 may be formed of a type of material and a thickness of material selected to rupture only if the reserve battery 10 is exposed to a predetermined acceleration for a predetermined time. The outer perimeter of the frangible barrier 14 is sealed with the inward-facing surface of the battery case 12 by a conventional method, such as an oxide glass to metal compression seal.

Cell electrodes 22 represent an assembly comprising a stacked spirally-wound arrangement of anodes, which may be formed from any suitable material (e.g., lithium), series-connected current collectors or cathodes, which are formed from an electrical conductor (e.g., high surface area carbon), and separators of electrically-insulating material between adjacent pairs of anodes and cathodes. The anodes of the cell electrodes 22 may include lithium deposited on thin nickel substrates and the current collectors may be high surface area carbon on a chemically etched thin nickel substrate. The invention contemplates that the cell electrodes 22 may have any conventional arrangement as understood by persons of ordinary skill in the art. The electrolyte 18 may be any suitable electrolyte, such as thionyl chloride or sufuryl chloride ($SO_2Cl_2$) which is commonly used in conjunction with lithium anodes. Excess electrolyte 18 may be housed inside compartment 16 to insure rapid and complete battery activation.

The electrolyte reservoir defined by sealed compartment 16 is closed on one end by the frangible barrier 14 and on the opposite end by a reservoir cover 24 including a rolling diaphragm 26. The rolling diaphragm 26 may be formed, for example, by a flexible annular nickel membrane having a thickness of about 0.002". The outer peripheral edge of rolling diaphragm 26 is sealed with the battery case 12.

Reservoir cover 24 further includes a fill port member 28 having a threaded fill port or fluid passageway 30 used for filling the reservoir of compartment 16 with the electrolyte 18, as explained below. An exposed first end face 32 of the fill port member 28 is sealed with an inner peripheral edge of rolling diaphragm 26. An opposite end face 34 of the fill port member 28 is positioned in compartment 16 proximate to the frangible barrier 14. The separation between the end face 34 and the nearby surface of the frangible barrier 14 is selected to minimize the likelihood that the reservoir cover 24 will inadvertently move, during handling and transportation, by an amount sufficient to rupture the frangible barrier 14 and activate the reserve battery 10. A portion of terminal pin 25 located inside compartment 20 is generally aligned with the end face 34, although the invention is not so limited, and may cooperate with fill port member 28 in rupturing the frangible barrier 14. The fill port member 28 may be formed from the same material as the battery case 12.

A closure element or insert 36, illustrated as a spherical stainless steel member or ball, is positioned in the fluid passageway 30 proximate to the second end face 34 and forms a sealing contact with a seat 40 defined inside the fluid passageway 30 proximate to end face 34. As described below, after the reservoir of compartment 16 is filled with electrolyte 18, the insert 36 is inserted with a frictional or interference fit into the fluid passageway 30. An outer circumferential surface of the insert 36 has a sealing contact that creates a hermetic seal for preventing electrolyte leakage.

With reference to FIGS. 1-3, a filling procedure for the reserve battery 10 will be described. As shown in FIG. 2, a fill tool 38 is coupled with a length of the fluid passageway 30 and the reservoir of compartment 16 is evacuated through an open lumen of fill tool 38. Then, a volume of the electrolyte 18 is introduced into the reservoir of compartment 16 through the open lumen of fill tool 38. While the fill tool 38 remains engaged with the fluid passageway 30 to stabilize and prevent unwanted movement of the fill port member 28, the insert 36 is inserted into the fluid passageway 30, as shown in FIG. 3, and forcefully driven into an interference fit with the seat 40. After installation, the insert 36 may project beyond the end face 34 or, alternatively, may be recessed inside fluid passageway 30 beneath the plane of the end face 34. The assembled reserve battery 10 is depicted in FIG. 1.

With reference to FIGS. 1 and 4, the activation of the reserve battery 10 will be described. The reserve battery 10 is incorporated as a component of a device, such as an artillery projectile, having an activation projection 42 and is free to move relative to the device. The reserve battery 10 is positioned in the device with the end face 32 of the fill port member 28 proximate to the activation projection 42. End face 32 may have a contacting relationship with the activation projection 42 or may be spaced a short distance from the activation projection 42 with a non-contacting relationship.

A circuit inside the device is electrically coupled with the battery case 12, which constitutes one connection point (i.e., a positive electrode) to the reserve battery 10, and with the terminal pin 25, which supplies the other connection point (i.e., negative electrode) with the reserve battery 10. In the condition shown in FIG. 1, the reserve battery 10 is dormant and voltage is not generated as the frangible barrier 14 isolates the electrolyte 18 from the cell electrodes 22. The reserve battery 10 is stored in this dormant state for an indefinite period until intentionally activated.

The reserve battery 10 is oriented inside the device such that when the device is subject to heavy acceleration, such as the set back force experienced when a weapon fires an artillery projectile, the entire reserve battery 10 moves in the direction of arrow 52 toward the activation projection 42. The applied force moving the reserve battery 10 toward the activation projection 42 is dependent upon the weight of the reserve battery 10. If the applied force is sufficient, contact between the end face 32 of fill port member 28 and the activation projection 42 precipitates dynamic displacement of the end face 34 of fill port member 28 toward frangible barrier 14. The rolling diaphragm 26, which yields or rolls as the fill port member 28 moves, facilitates the displacement.

The moving fill port member 28 effectively operates as a ram against the frangible barrier 14. As a result, either the end face 34 of the fill port member 28 or a portion of the insert 36 projecting beyond the plane of the end face 34 is driven into the frangible barrier 14 and, in cooperation with the terminal pin 25, causes rupture of the frangible barrier 14. Rupturing the frangible barrier 14 releases the electrolyte 18 inside compartment 16 from its confinement for rapid flow into compartment 20. Remnants or fragments 14a of the frangible barrier 14 are present in the electrolyte 18 but do not affect battery operation. The electrolyte 18 wets the cell electrodes 22 residing in compartment 20 and, thereby, activates the reserve battery 10 to generate electric current that energizes the circuit of the device coupled with battery 10. The capacity of the reserve battery 10 is specified by the application. For example, the reserve battery 10 should have a capacity adequate to at least permit in-flight operation of circuitry in an artillery projectile.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

The scope of the invention itself should only be defined by the appended claims, wherein I claim:

1. A reserve battery comprising:
   a liquid electrolyte;
   a case having a first compartment and a second compartment containing the liquid electrolyte;
   a plurality of cell electrodes positioned in said first compartment;
   a frangible barrier positioned inside said case, said frangible barrier separating said first compartment from said second compartment so that the liquid electrolyte in said second compartment is isolated from said first compartment;
   an elongate member having a first end, a second end proximate to said frangible barrier, and a fluid passageway extending from said first end to said second end, said fluid passageway in communication with an exterior of said case for transferring the liquid electrolyte from the exterior of said case to said second compartment for containment in the second compartment until the reserve battery is activated by a force applied to the case; and
   a rolling diaphragm connecting said first end of said elongate member with said case, said rolling diaphragm configured to yield in response to the force so that said second end of said elongate member is movable toward said frangible barrier to an extent sufficient to contact and rupture said frangible barrier.

2. The reserve battery of claim 1 further comprising:
   a closure element engaged with a portion of said fluid passageway to provide a fluid seal.

3. The reserve battery of claim 2 wherein said fluid passageway includes a circular seat and said closure element comprises a spherical ball engaged in an interference fit with said circular seat.

4. The reserve battery of claim 2 wherein said closure element is positioned in said fluid passageway for contacting said frangible barrier when said elongate member moves toward said frangible barrier.

5. The reserve battery of claim 2 wherein said closure element is recessed inside said fluid passageway so that said second end of said elongate member contacts said frangible barrier when said elongate member moves toward said frangible barrier.

6. The reserve battery of claim 1 further comprising:
   a terminal pin electrically coupled with said plurality of cell electrodes, said terminal pin penetrating through said case such that a first portion is positioned inside said first compartment and a second portion is accessible from outside of said case for establishing an electrical connection with a circuit external to the case.

7. The reserve battery of claim 6 wherein said first portion is located on an opposite side of said frangible barrier from said second end of said elongate member, said first portion cooperating with said second end of said elongate member for contacting and rupturing said frangible barrier.

8. The reserve battery of claim 1 further comprising:
   a terminal pin electrically coupled with said plurality of cell electrodes, said terminal pin penetrating through said case such that a first portion is positioned inside said second compartment and a second portion is accessible from outside of said case for establishing an electrical connection with a circuit external to the case.

9. The reserve battery of claim 8 wherein said first portion is located on an opposite side of said frangible barrier from said second end of said elongate member and is generally aligned with said elongate member, said first portion cooperating with said second end of said elongate member for contacting and rupturing said frangible barrier.

* * * * *

UNITED STATES PATENT AND TRADEMARK OFFICE
CERTIFICATE OF CORRECTION

| | | |
|---|---|---|
| PATENT NO. | : 7,504,177 B2 | Page 1 of 1 |
| APPLICATION NO. | : 10/924000 | |
| DATED | : March 17, 2009 | |
| INVENTOR(S) | : Mark John Peabody | |

It is certified that error appears in the above-identified patent and that said Letters Patent is hereby corrected as shown below:

Column 2, line 60, change "insolates" to --isolates--.

Column 3, line 30, change "sufuryl" to --sulfuryl--.

Signed and Sealed this

Twenty-first Day of July, 2009

JOHN DOLL
*Acting Director of the United States Patent and Trademark Office*